Figure 1:
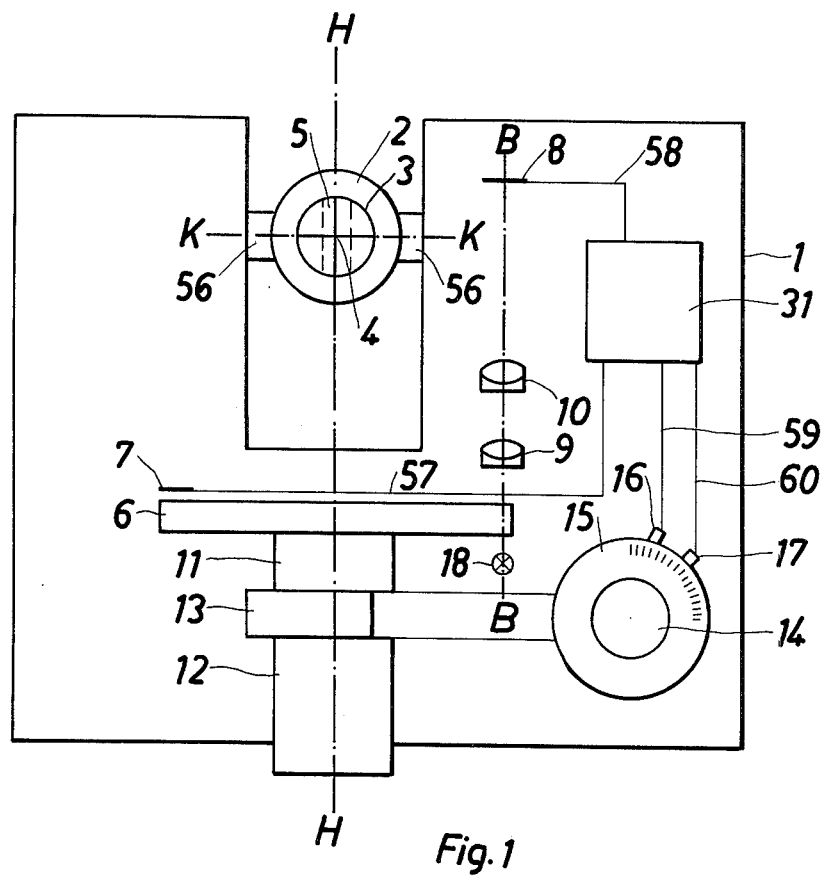

United States Patent

Feist et al.

[11] 4,093,383
[45] June 6, 1978

[54] ANGLE MEASURING DEVICE WITH A TELESCOPE

[75] Inventors: Wieland Feist; Klaus Junghanns; Alfred Kunz, all of Jena, Germany

[73] Assignee: Jenoptik Jena G.m.b.H., Jena, Germany

[21] Appl. No.: 748,623

[22] Filed: Dec. 16, 1976

[30] Foreign Application Priority Data

Jan. 9, 1976   Germany .................... 01190745

[51] Int. Cl.² .............. G01B 11/26; G01C 1/00; G01C 1/06
[52] U.S. Cl. .................... 356/152; 33/1 T; 33/281; 250/231 SE; 350/10; 356/142; 356/147
[58] Field of Search ........... 33/1 PT, 1 N, 1 T, 246, 33/268, 281; 250/231 SE; 350/10; 356/138, 141, 147, 152, 139, 140, 142, 29

[56] References Cited

U.S. PATENT DOCUMENTS

| | | | |
|---|---|---|---|
| 3,175,458 | 3/1965 | Costa | 350/10 |
| 3,381,288 | 4/1968 | Vlodrop | 250/231 SE |
| 3,557,458 | 1/1971 | Shults | 33/281 |
| 3,604,810 | 9/1971 | Schuch | 250/231 SE X |

Primary Examiner—S. C. Buczinski

[57] ABSTRACT

An angle measuring device comprises a base, a telescope seated thereupon for rotation about an axis, a graduated circle having a line division, a micrometer for subdividing said line division, and photoelectric scanners for detecting angular values from said line division and from said micrometer. A graduated plate provided with a reticle is located in said telescope. Said reticle has a zone limited by two line marks which are arranged in parallel and symmetrically to and on either side of one of the reticle lines. Said two lines are spaced from said reticle line by a width which is at least double the size of one division interval of the graduated circle line division.

1 Claim, 6 Drawing Figures

ANGLE MEASURING DEVICE WITH A TELESCOPE

This invention concerns an angle measuring device with a telescope in which a reticle is provided on a graduated plate for defining a target line.

Said device is seated for rotation about at least one axis. The rotations are measured by a graduated circle in cooperation with a light mark which, when pasing a graduation line of the graduated circle, transmits light to a light electric detector. A graduation circle interval is interpolated by means of a light electric micrometer which is provided with a raster the lines of which cooperate even with the smallest interval of the graduated circle.

In known angle measuring devices the course reading as well as the fine reading is performed by mechanical rasters.

These rasters are, for example, rim gears, in which the space between the individual teeth corresponds to a definite angular value.

When, in the course of a coarse adjustment, the telescope is rotated, it snaps into the nearest notch when it arrives at a target line.

In this position the telescope is fine adjusted by means of a micrometer.

The micrometer is coupled to a counting means which counts the rotations in angular units necessary to find the target.

Telescopes employed in known optical measuring devices, such as collimators and theodolites, use multiple reticles for target finding.

These are not directly connected to the graduated circles of, for example, a theodolite, in order to read angles.

In collimators such multiple reticles are employed for a precision finding of additional line marks arranged in the collimator.

In theodolites additional line marks are utilised in the telescope field of view particularly for range finding operations according to the Reichenbach method or for multiple target finding of moving targets in the field of geodetic astronomy.

The known angle measuring systems have several disadvantages.

Due to the use of rim gears instead of graduated circles and to the use of hand or motor operated micrometers, the mechanical components of these angular measuring devices are very expensive.

The mutual spaces between the raster grooves of a rim gear have to be high quality and the distances between the teeth cannot be reduced at will otherwise a safe snapping in the grooves is not guaranteed any more. The rim gears are fast to the respective devices and therefore a reiteration is not possible, which means that the operator has to calculate an accidentally given initial angular value, which makes the measuring operation very complicated.

It is an object of the present invention to obviate the above disadvantages.

It is a further object of the present invention to provide an angular measuring device which by employing optical raster means eliminates the mechanical expenditures involved in the previously used rim gears.

It is still a further object of the present invention to provide a horizontal graduated circle which permits reiteration so that any desired direction can become the zero-direction. These and other objects are realised by the invention in which a zone is marked symmetrically to at least one line or pair of lines of a reticle substantially in parallel to an axis of rotation and in which the width of the zone is at least double the width of the smallest interval of the graduated circle. By virtue of the invention a raster means for optical scanning is provided in an angular measuring device and the scanning is realised by means of a zone symmetrically arranged to each pair of lines of the reticle within the spaces defined by the graduation lines of the graduated circle.

The coarse target finding is carried out outside of said zone whereas the fine finding measures the remaining interval. When sweeping the zone up to the reticle through the target, a coincidence is obtained between a line of the graduated circle and a light electric detector which produces an electric signal.

Said signal triggers an electronic evaluation system for measuring the angle.

Figure 2:
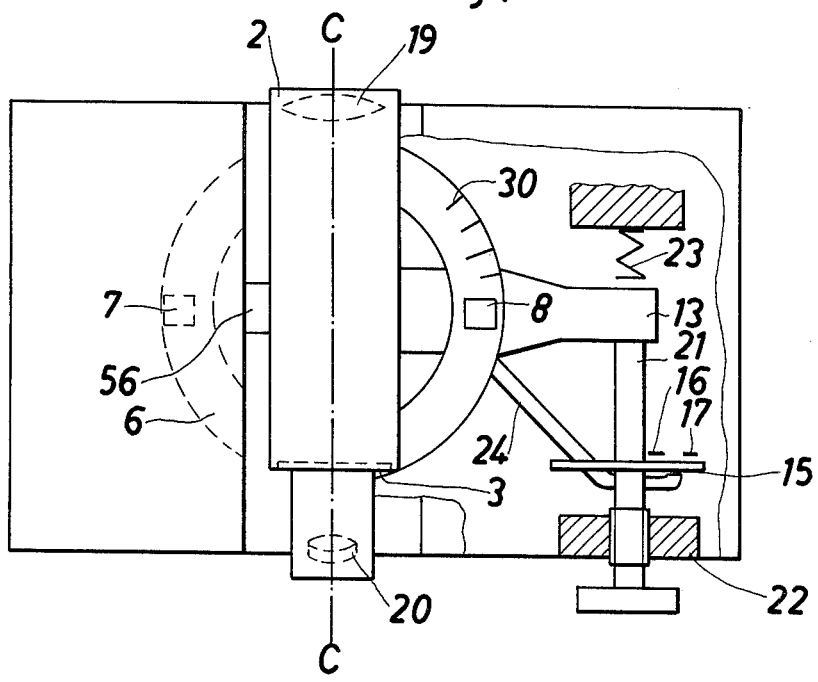
Figure 3:
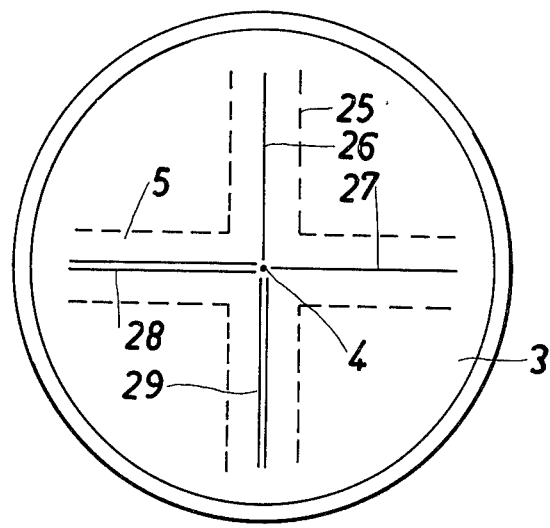
Figure 4:
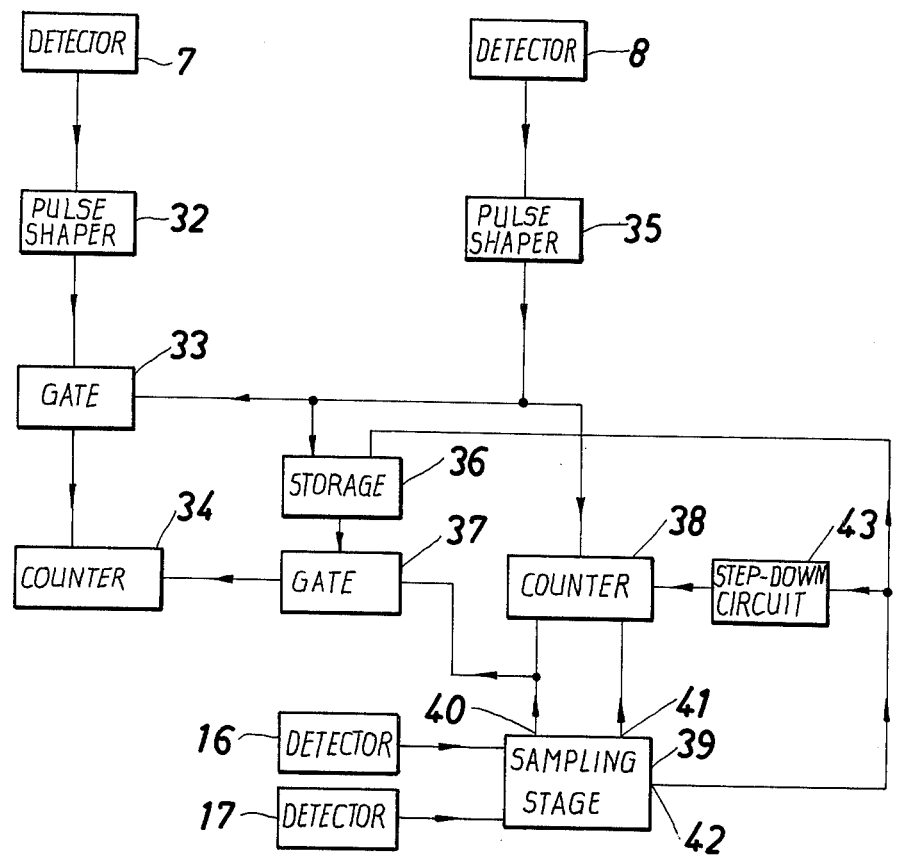
Figure 5:
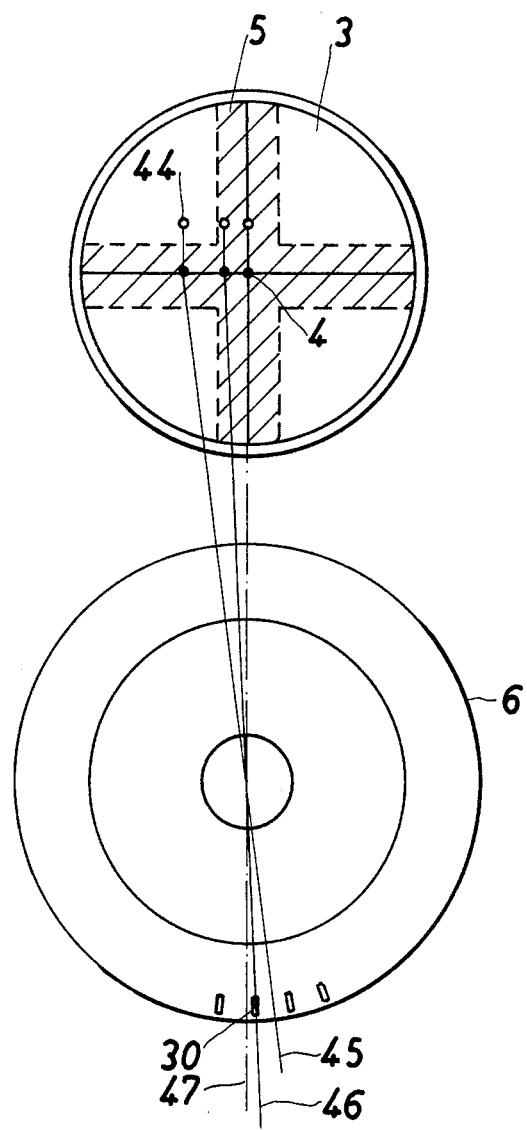
Figure 6:
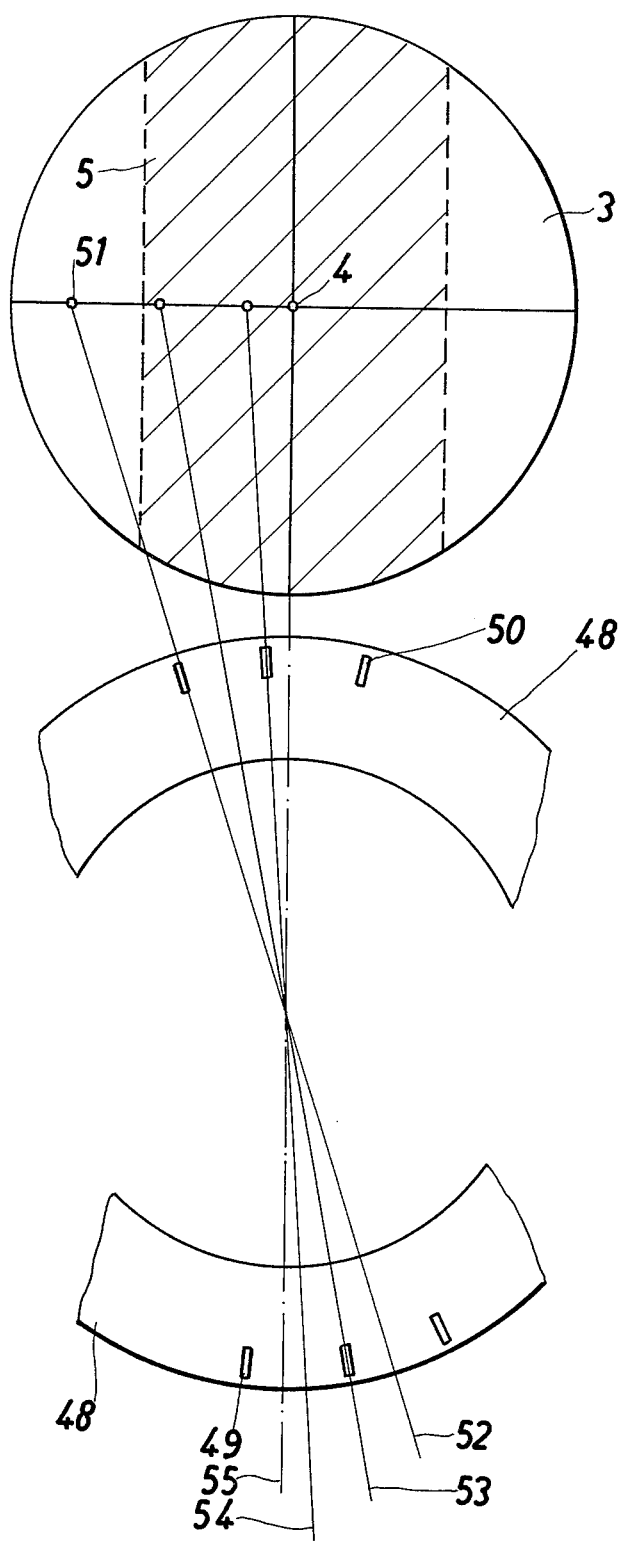

In order that the invention may be more readily understood reference is made to the accompanying drawings which illustrate diagrammatically and by way of example two embodiments thereof and in which:

FIG. 1 is a schematical front view of an angular measuring device,

FIG. 2 a sectional top view of the angular measuring device of FIG. 1,

FIG. 3 a telescope field of view of the angular measuring device as shown in connection with FIGS. 1 and 2, FIG. 4 is a block scheme of an electronic evaluation system of the angular measuring device shown in FIGS. 1 to 3, FIG. 5 a schematical representation of the measuring principle with one reading position, and FIG. 6 is a further schematicl representation of the measuring principle with two reading positions.

In FIGS. 1 and 2 in a housing 1, a telescope 2 is seated for rotations in trunnions 56 about an axis K—K and an axis H—H. Said axes are at right angles to each other. A graduated plate 3, located in the telescope 2, is provided with a reticle 4 and zones 5, which are described in more detail in connection with FIG. 3.

In alignment with the axis H—H a graduated circle 6 is arranged, the graduations 30 of which consist of transparent lines on an opaque base.

A first light electric detector (scanner) 7 and a second light electric detector (scanner) 8, the latter preferably being a differential photodetector, are mounted in spaced relation above the circle 6 and are connected via lines 57 and 58, respectively, with an electronic evaluation unit 31.

In parallel to the axis H—H an optical axis B—B is provided about which a light source 18, a first and a second optical imaging system 9, 10 are arranged, in the image plane of the latter the light electric detector 8 is located to receive light from said light source 18.

In the housing 1 a light electric micrometer 14 is mounted which includes a raster disc 15, two light electric detectors 16, 17 (electro-optic scanning means) and a micrometer screw 21.

The housing 1 is seated for rotation about the axis H—H in a non-displaceable socket 12. A lever 13 which permits clamping of and against the socket 12, is seated on the latter for rotation about the axis H—H.

A base 11 which carries the graduated circle 6 is rotatably seated on the socket 12 independent of the other elements, and is capable of performing reiteration operations.

The light electric detectors 16, 17 are connected to the electronic evaluating system 31 via connection lines 59, 60.

The light source 18 is located beneath the graduated circle on the extension of the axis B—B for illuminating said graduated circle 6.

The telescope 2 comprises an objective 19, an eyepiece 20 and the graduated plate 3 about a common axis C—C which is the target line of the telescope. The micrometer screw 21 which is part of the micrometer 14 is passed through a screw socket 22, fast to the housing 1.

A spring 23 abuts against the housing 1 via the micrometer screw 21 for resilient action on the displacement lever 13. A light cable 24 transfers the light from the light source 18 to the raster 15 for illuminating the division thereof.

When a target (not shown) is coarsely sighted the telescope is rotated about the axis H—H. The subsequent fine setting is carried out by means of the micrometer 14. When the measuring screw 21 is operated the housing 1 is rotated and hence the telescope 2 connected thereto, the light electric detectors 7, 8 with the optical imaging system 9, 10 are rotated relative to the nondisplaceable graduated circle 6. The amount of rotation is the same for all components involved.

When the light electric detector 8 sweeps a graduation line 30, illuminated from the light source 18, an electric signal is produced which triggers the electronic evaluation system 31, as described in more detail hereinafter. Simultaneously the coarse reading is taken via the light electric detector 7.

The electric signals produced in the light electric detectors 16, 17 and derived from the division lines of the raster disc 15 when illuminated from the light source 18 via the light cable 24, yield the fine reading of the angles in the electronic evaluation system 31. The design of the angular measuring device is not restricted to the embodiment as represented in connection with the present schematical arrangement.

Alternatively, only one light electric detector 7 can be employed and one opto-electric scanner 16 for reading the respective angular value on the micrometer.

Moreover, the telescope can be seated for rotation relative to the telescope base only about one axis, and there are a plurality of graduation circles feasible having each more than one line division per graduation circle.

In FIG. 3 the graduated plate 3, arranged in the telescope 2 in front of the eyepiece 20 (FIG. 2), is provided with a reticle 4. The limiting lines 25 of zones 5 are symmetrically located relative to the lines 26, 27 and to the pair of lines 28, 29. The width of the zones 5 is at least double the size of the smallest graduation circle interval. Said zones 5 permit an interpolation at both, a horizontal and a vertical angular measurement. In FIG. 4 a block scheme of an electronic evaluation circuit is shown. The signals, derived from the detector 7 are fed into a counter 34 via trigger and pulse shaper stage 32 and sampling gate 33. The electric signals from the light electric detector 8 are fed into a second trigger and pulse shaper stage 35, the output of which is simultaneously connected to the sampling gate 33 and via a storage stage 36 and a gate 37 to the counter 34, and to the zero-input of a bi-directional counter 38.

A bi-directional sampling stage 39 processes the signals derived from the light electric detectors 16, 17. The outputs 40, 41 of said stage 39 are connected to the bi-directional counter 38, simultaneously the output 40 is connected with the gate 37.

The pulse counter output 42 of stage 39 is connected to the storage 36 and, via a stepdown circuit 43 to the bi-directional counter 38.

When an illuminated graduation line is scanned an electric signal is produced in the light electric detector 8 which is subsequently fed into the trigger and pulse generating stage 35 for producing a clock-pulse, which opens the sampling gate 33 and simultaneously resets the bi-directional counter 38.

The electric signals derived from the light electric detector 7 and indicative of the coarse division of the graduated circle 6 (FIG. 2) are pulse shaped in the trigger and pulse shaper stage 32. The shaped pulses are fed into the open sampling gate 33 and from there to the preset inputs of the counter 34 which indicates a coarse angular value.

When the micrometer 14 in FIG. 1 is reversely rotated the angular value of the coarse reading has to be reduced by one unit. Therefore the counter 34 is employed for counting backwards.

The decision, whether a forward/backward counting is concerned, is carried out by the signals derived from the light electric detectors 16, 17 and the corresponding signals are processed in the bi-directional sampling stage 39, which provides the backward counting control signals at output 40 and the forward counting control signals at the output 41.

Both signals are fed into the bi-directional counter 38, which indicates the angular value set by the micrometer 14 (FIG. 1).

The last clock signal is fed into the storage 36 to reset the counter 34 by one unit. The next counting pulse which arrives from the output 42 of the bi-directional sampling stage 39 passes the clock signal to gate 37, which is opened by the signal present at the output 40 of the bi-directional sampling stage 39 in the course of the backward counting and thus the reset pulse is fed into the counter 34.

In order to keep the matching error arising from out of the discrepancies between the raster disc division 15 and the division of the graduated circle 6 to smallest possible values the division of the raster disc 15 (FIG. 1) is very finely subdivided.

When, for example, the number of raster lines is tenfold increased, the tenfold number of counter pulses are fed from the output 42 of the bi-directional sampling stage 39 into the bi-directional counter 38. When, however, the original resolution of the interpolation system has to be maintained the last position of the angular value indicated is not read, which corresponds to a 10:1 step-down ratio.

When other than the above raster divisions are used, the step-down circuit 43 is connected in series with the bi-directional counter 38.

Said circuit reduces the number of counting pulses to the original one, that is, to that of the non-subdivided raster disc 15 (FIG. 1), which corresponds to the value of the desired resolution of the interpolation system.

In connection with the schematic representation of FIG. 5, a first measuring principle is explained in more detail.

The graduated plate 3 is located in the telescope 2 (FIG. 1) and shows the zones 5 and the reticle 4.

A target point 44 is coarsely sighted in such a manner that the image thereof lies outside of the zone 5 in the telescope field of view.

In this position the housing 1 is indirectly clamped against the socket 12 by means of the lever 13 and the light electric detector 8 (FIG. 1), which starts the electronic evaluation system 31, takes a position 45 between two graduation lines.

A target point 44 is captured in the reticle 4 in the course of the fine adjustment by means of the micrometer 14 as described in connection with FIG. 1.

In a position 46, in which coincidence between the illuminated graduation line 30 and the light electric detector 8 prevails, the electronic evaluation system 31 is actuated.

When the target point 44 is captured in the reticle 4 (position 47) the measuring operation is finished. Since the width of the zone 5 is at least double the width of the smallest graduation circle interval, there will be in any case a coincidence position 45 which is scanned in the course of the fine adjustment.

This is valid for the target point finding from both sides as well as for a vertical angle measurement.

A second angular measuring principle is illustrated in connection with FIG. 6.

Again the graduated plate 3 is located in the telescope 2 (FIG. 1) with zones 5 and the reticle 4. Lines 49, 50 of a graduation are arranged on a graduated circle 48 in diametral opposition.

The graduation lines 49, 50 are made transparent on an opaque base.

A target point 51 is sighted in such a manner that the image thereof lies outside the zones 5 on the graduated plate 3 (starting position 52). The fine adjustment is now carried out with the graduated circle 48 clamped.

When an illuminated graduation line of the division 49 (position 53) is scanned via a not shown imaging system a light signal impinges on a first light sensitive area of a not shown light electric detector, which preferably is a differential photodetector.

The resulting electric signal actuates the electronic evaluation system as alredy described in connection with FIG. 4.

In the course of a continuous fine adjustment an illuminated graduation line of the division 50 is scanned by a second line sensitive area of the not shown light electric detector by means of the not shown optical imaging system (position 54).

The electric signals derived control a unit for formation of a mean value, included in the electronic evaluation system, of the angular coarse values scanned from the positions 53, 54.

At the same time the electronic counting unit is triggered to count the remaining intervals between the mean positions 53, 54 and an end position 55.

In any event there are two coincidence positions 53, 54 guaranteed due to the zone 5 which has at least double the width of the smallest graduation circle interval and due to the arrangement of the line divisions 49, 50 of the graduated circle 48.

The mean value formation which can thus be carried out has the advantage of a higher reading precision since division and excentricity errors are eliminated.

We claim:
1. An angle measuring device comprising
   a base,
   a telescope being seated for rotation about at least one axis relative to said base,
   at least one graduated circle being provided with at least
   one line division of equally spaced intervals, said graduated circle being connected to said base,
   at least one scanner being connected with said telescope said scanner and said graduated circle being for measuring the rotations of said telescope,
   a micrometer for subdividing said division intervals,
   at least one electro-optic scanning means for taking readings on said micrometer,
   electronic means connected to said scaner and said reading means for detecting signals from said scanner and said reading means and for formation of an angular measuring result,
   a graduated plate being arranged in the field of view of said telescope and being provided with a reticle, said graduated plate being provided with two lines substantially symmetrical and in parallel with one line of said reticle and being spaced apart from said one line by at least the width of one division interval of said line division.

* * * * *